US012618670B2

(12) United States Patent
Johnston

(10) Patent No.: US 12,618,670 B2
(45) Date of Patent: May 5, 2026

(54) MULTIPLE SINGLE-AXIS TRACKERS FOR SURVEY EQUIPMENT

(71) Applicant: Trimble Inc., Westminster, CO (US)

(72) Inventor: Wayne Johnston, Broomfield, CO (US)

(73) Assignee: Trimble Inc., Westminster, CO (US)

( * ) Notice: Subject to any disclaimer, the term of this patent is extended or adjusted under 35 U.S.C. 154(b) by 453 days.

(21) Appl. No.: 18/379,451

(22) Filed: Oct. 12, 2023

(65) Prior Publication Data

US 2025/0123100 A1      Apr. 17, 2025

(51) Int. Cl.
*G01C 1/02* (2006.01)
*G01C 15/00* (2006.01)
*G01C 15/06* (2006.01)

(52) U.S. Cl.
CPC ............. *G01C 1/02* (2013.01); *G01C 15/002* (2013.01); *G01C 15/06* (2013.01)

(58) Field of Classification Search
CPC ........ G01C 1/02; G01C 15/002; G01C 15/06; G01S 7/4972; G01S 17/66
See application file for complete search history.

(56) References Cited

U.S. PATENT DOCUMENTS

| | | | |
|---|---|---|---|
| 7,800,758 B1 * | 9/2010 | Bridges | G01B 11/03 356/482 |
| 11,493,632 B2 * | 11/2022 | Vogel | G01C 11/06 |
| 11,656,357 B2 * | 5/2023 | Pivac | G01B 9/02029 356/614 |
| 11,802,966 B2 * | 10/2023 | Vogel | G01C 11/06 |
| 12,123,717 B2 * | 10/2024 | Johnston | G06T 7/73 |

| | | | |
|---|---|---|---|
| 2020/0124730 A1 * | 4/2020 | Vogel | G01C 11/06 |
| 2023/0050812 A1 * | 2/2023 | Vogel | G01S 17/66 |
| 2023/0168377 A1 * | 6/2023 | Kikuchi | G01S 17/42 356/4.01 |
| 2023/0221118 A1 * | 7/2023 | Johnston | G06T 7/73 33/228 |
| 2024/0418509 A1 * | 12/2024 | Johnston | G01C 15/008 |
| 2025/0123100 A1 * | 4/2025 | Johnston | G01C 1/02 |
| 2025/0207915 A1 * | 6/2025 | Kotzur | G01S 17/66 |

FOREIGN PATENT DOCUMENTS

| | | | | |
|---|---|---|---|---|
| EP | 4242584 A1 * | 9/2023 | ........... | G01C 15/004 |
| WO | WO-2010057169 A2 * | 5/2010 | ............ | G01B 11/03 |
| WO | WO-2021096328 A2 * | 5/2021 | ............ | H04N 23/60 |

OTHER PUBLICATIONS

Extended European Search Report for Application No. 24204473.3-1009, mailed Mar. 24, 2025, 10 pages.

* cited by examiner

*Primary Examiner* — Yaritza Guadalupe-McCall
(74) *Attorney, Agent, or Firm* — Kilpatrick Townsend & Stockton LLP

(57) ABSTRACT

A total station includes a telescope and a tracking system for aligning an axis of the total station with a target. The tracking system includes a first emitter that emits first light toward the target and a first sensor that receives the first light reflected off the target. The first emitter and first sensor are horizontally offset from a lens center of the telescope. The tracking system also includes a second emitter that emits second light toward the target and a second sensor that receives the second light reflected off the target. The second emitter and second sensor are vertically offset from a lens center of the telescope. Corrective rotations are computed based on the received first light and the received second light.

20 Claims, 10 Drawing Sheets

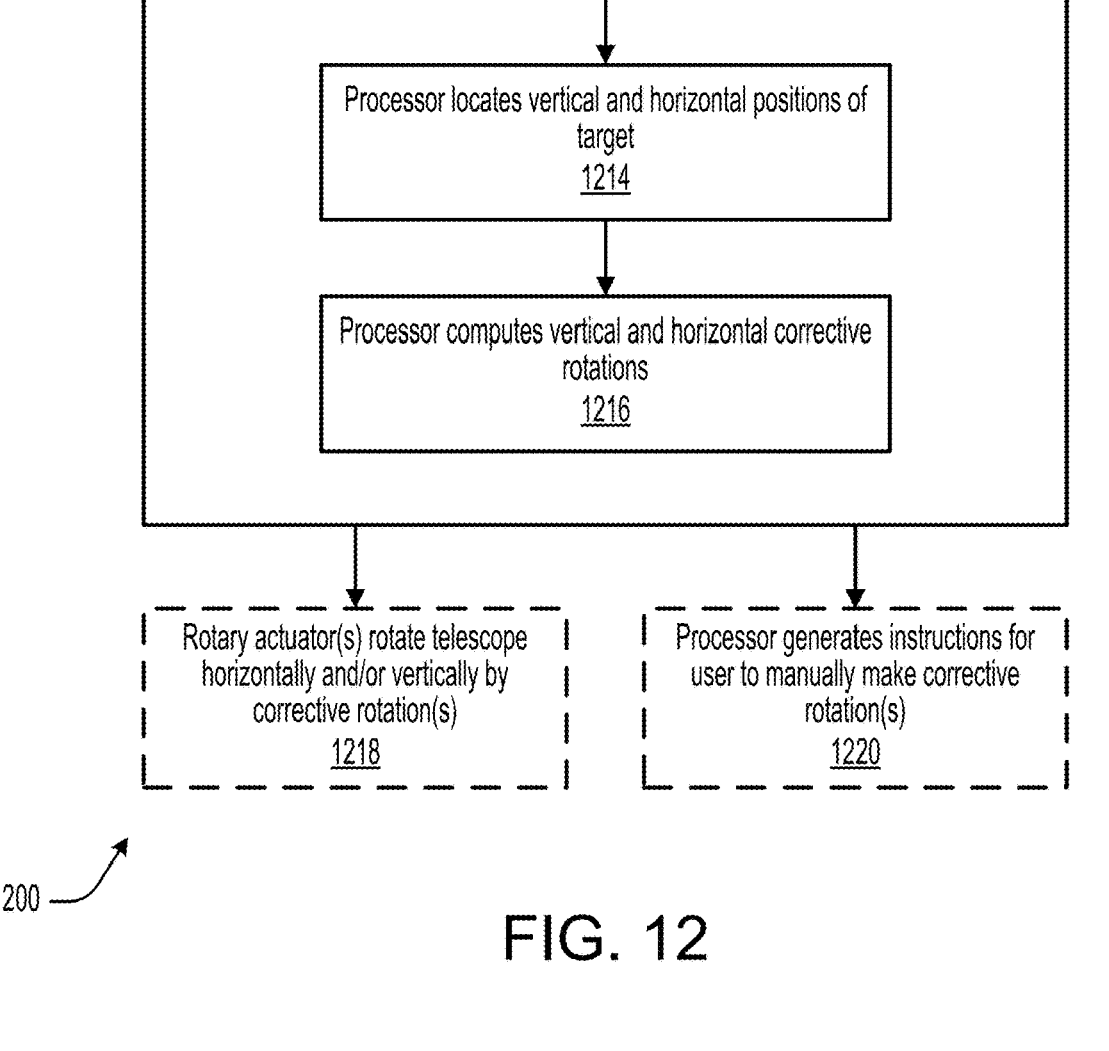

First emitter transmits first light toward target
1202

Second emitter transmits second light toward target
1206

First sensor receives first light reflected off target
1204

Second sensor receives second light reflected off target
1208

Processor computes corrective rotation(s) for aligning optical aiming axis with target based on received first and second light
1210

Processor obtains first and second matrices of light values
1212

Processor locates vertical and horizontal positions of target
1214

Processor computes vertical and horizontal corrective rotations
1216

Rotary actuator(s) rotate telescope horizontally and/or vertically by corrective rotation(s)
1218

Processor generates instructions for user to manually make corrective rotation(s)
1220

MULTIPLE SINGLE-AXIS TRACKERS FOR SURVEY EQUIPMENT

BACKGROUND

A total station is an electronic/optical instrument that is capable of making angle, distance, and coordinate measurements. A total station may be a combination of a theodolite and an electronic distance measurement (EDM) device, and may further include computer components such as processors, memory, and a display providing a user interface. Typically, a total station is used for surveying and building construction, however other applications are possible. While a conventional total station (or mechanical total station (MTS)) may require two people to operate, a robotic total station (RTS), which provides remote control, can be operated by a single person.

For a simple angle measurement, the total station may be set up at a first location, and two pole-mounted prisms (i.e., targets) may be set up at distances away from the total station at a second and a third location. The total station may be controlled to sight the first pole-mounted prism, and the horizontal angle reading may be set to zero. The total station may then be horizontally rotated until sighting the second pole-mounted prism, and the horizontal angle difference may be measured and presented to a user (e.g., on the display). Alternatively, an angle may be measured from a reference direction (e.g., North) to a single pole-mounted prism.

For a simple distance measurement, the total station may be set up at a first location, and a single pole-mounted prism may be set up at a distance away from the total station at a second location. The total station may be controlled to sight the pole-mounted prism, and a distance measurement along with a vertical angle measurement may be made. Using these measurements, a horizontal distance and a vertical distance between the total station and the prism may be calculated and presented to a user.

For a simple coordinate measurement, the total station is set up at a reference point that has a known coordinate (e.g., X, Y, and Z; or easting, northing, and elevation). In some instances, the known coordinate may be determined using a Global Navigation Satellite System (GNSS) receiver, such as the United States' Global Positioning System (GPS). A single pole-mounted prism is then set up at a distance away from the total station at a second location. One or more distance and angle measurements may then be made to determine the coordinate of the prism based on the known coordinate. For example, a horizontal angle measurement may be made between North and the prism, a vertical angle measurement may be made between the horizontal direction and the prism, and a distance measurement may be made between the total station and the prism. These measurements can be used to translate the known coordinate into the coordinate of the prism.

SUMMARY

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a geodetic apparatus comprising: a telescope defining an optical aiming axis, the telescope comprising a front lens having a lens center; a tracking system for aligning an axis of the geodetic apparatus (e.g., the axis passing through the lens center) with a target, the tracking system comprising: a first emitter horizontally offset from the lens center and configured to emit first light toward the target; a first sensor horizontally offset (or offset in a first lateral direction) from the lens center and configured to receive the first light reflected off the target; a second emitter vertically offset from the lens center (or offset in a second lateral direction) and configured to emit second light toward the target; and a second sensor vertically offset from the lens center and configured to receive the second light reflected off the target; and a processor configured to compute one or more corrective rotations for aligning the axis of the geodetic apparatus with the target based on the received first light and the received second light. The axis of the geodetic apparatus may be an optical aiming axis of the telescope or an EDM axis of an EDM unit.

Example 2 is the geodetic apparatus of example(s) 1, wherein the first emitter and the first sensor are vertically aligned with the lens center, and wherein the second emitter and the second sensor are horizontally aligned with the lens center.

Example 3 is the geodetic apparatus of example(s) 1-2, wherein the first emitter and the first sensor are disposed on opposite horizontal sides of the front lens, and wherein the second emitter and the second sensor are disposed on opposite vertical sides of the front lens.

Example 4 is the geodetic apparatus of example(s) 1-3, further comprising: one or more rotary actuators configured to rotate the telescope horizontally and/or vertically by the one or more corrective rotations to align the optical aiming axis and/or the EDM axis with the target.

Example 5 is the geodetic apparatus of example(s) 1-4, wherein the processor is further configured to: obtain a first matrix of light values based on the received first light, the first matrix of light values corresponding to different vertical positions; and obtain a second matrix of light values based on the received second light, the second matrix of light values corresponding to different horizontal positions.

Example 6 is the geodetic apparatus of example(s) 5, wherein the first matrix of light values is a one-dimensional (1D) matrix with different light values corresponding to the different vertical positions, and the second matrix of light values is a 1D matrix with different light values corresponding to the different horizontal positions.

Example 7 is the geodetic apparatus of example(s) 5, wherein the first matrix of light values is a two-dimensional (2D) matrix with different light values correspond to the different vertical positions and the different horizontal positions, and the second matrix of light values is a 2D matrix with different light values correspond to the different horizontal positions and the different vertical positions.

Example 8 is the geodetic apparatus of example(s) 7, wherein the processor is further configured to: convert the first matrix of light values from the 2D matrix with different light values corresponding to the different vertical positions and the different horizontal positions to a one-dimensional (1D) matrix with different light values corresponding to the different vertical positions; and convert the second matrix of light values from the 2D matrix with different light values corresponding to the different horizontal positions and the different vertical positions to a 1D matrix with different light values corresponding to the different horizontal positions.

Example 9 is the geodetic apparatus of example(s) 5, wherein the processor is further configured to: locate a vertical position of the target using the first matrix of light values; and locate a horizontal position of the target using the second matrix of light values.

Example 10 is the geodetic apparatus of example(s) 5, wherein the processor is further configured to: compute a vertical rotation of the one or more corrective rotations using the first matrix of light values; and compute a horizontal rotation of the one or more corrective rotations using the second matrix of light values.

Example 11 is the geodetic apparatus of example(s) 1-10, further comprising: the EDM unit configured to emit third light toward the target, receive the third light reflected off the target, measure a distance between the geodetic apparatus and the target based on the received third light.

Example 12 is the geodetic apparatus of example(s) 1-11, wherein the EDM unit defines the EDM axis, and wherein the EDM axis is coaxial with the optical aiming axis.

Example 13 is the geodetic apparatus of example(s) 1-12, wherein the first emitter or the first sensor define a first tracker axis, the second emitter or the second sensor define a second tracker axis, and wherein the first tracker axis and the second tracker axis are each non-coaxial with the optical aiming axis.

Example 14 is a method of operating a geodetic apparatus having a telescope, the method comprising: emitting, by a first emitter horizontally offset from a lens center of the telescope, first light toward a target; receiving, by a first sensor horizontally offset from the lens center, the first light reflected off the target; emitting, by a second emitter vertically offset from the lens center, second light toward the target; and receiving, by a second sensor vertically offset from the lens center, the second light reflected off the target; and computing one or more corrective rotations for aligning an axis of the geodetic apparatus with the target based on the received first light and the received second light. The axis may be an optical aiming axis of the telescope or an EDM axis.

Example 15 is the method of example(s) 14, further comprising: obtaining a first matrix of light values based on the received first light, the first matrix of light values corresponding to different vertical positions; and obtaining a second matrix of light values based on the received second light, the second matrix of light values corresponding to different horizontal positions.

Example 16 is the method of example(s) 15, further comprising: locating a vertical position of the target using the first matrix of light values; and locating a horizontal position of the target using the second matrix of light values.

Example 17 is the method of example(s) 15, further comprising: computing a vertical corrective rotation of the one or more corrective rotations using the first matrix of light values; and computing a horizontal corrective rotation of the one or more corrective rotations using the second matrix of light values.

Example 18 is a non-transitory computer-readable medium comprising instructions that, when executed by one or more processors, cause the one or more processors to perform operations comprising: causing a first emitter horizontally offset from a lens center of a telescope to emit first light toward a target; causing a first sensor horizontally offset from the lens center to receive the first light reflected off the target; causing a second emitter vertically offset from the lens center to emit second light toward the target; and causing by a second sensor vertically offset from the lens center to receive the second light reflected off the target; and computing one or more corrective rotations for aligning an axis of the geodetic apparatus with the target based on the received first light and the received second light. The axis may be an optical aiming axis of the telescope or an EDM axis.

Example 19 is the non-transitory computer-readable medium of example(s) 19, further comprising: obtaining a first matrix of light values based on the received first light, the first matrix of light values corresponding to different vertical positions; obtaining a second matrix of light values based on the received second light, the second matrix of light values corresponding to different horizontal positions; and locating a vertical position of the target using the first matrix of light values; locating a horizontal position of the target using the second matrix of light values.

Example 20 is the non-transitory computer-readable medium of example(s) 19, further comprising: computing a vertical corrective rotation of the one or more corrective rotations using the vertical position of the target; and computing a horizontal corrective rotation of the one or more corrective rotations using the horizontal position of the target.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

FIG. 12 illustrates an example method of operating a geodetic apparatus.

DETAILED DESCRIPTION

Figure 1:
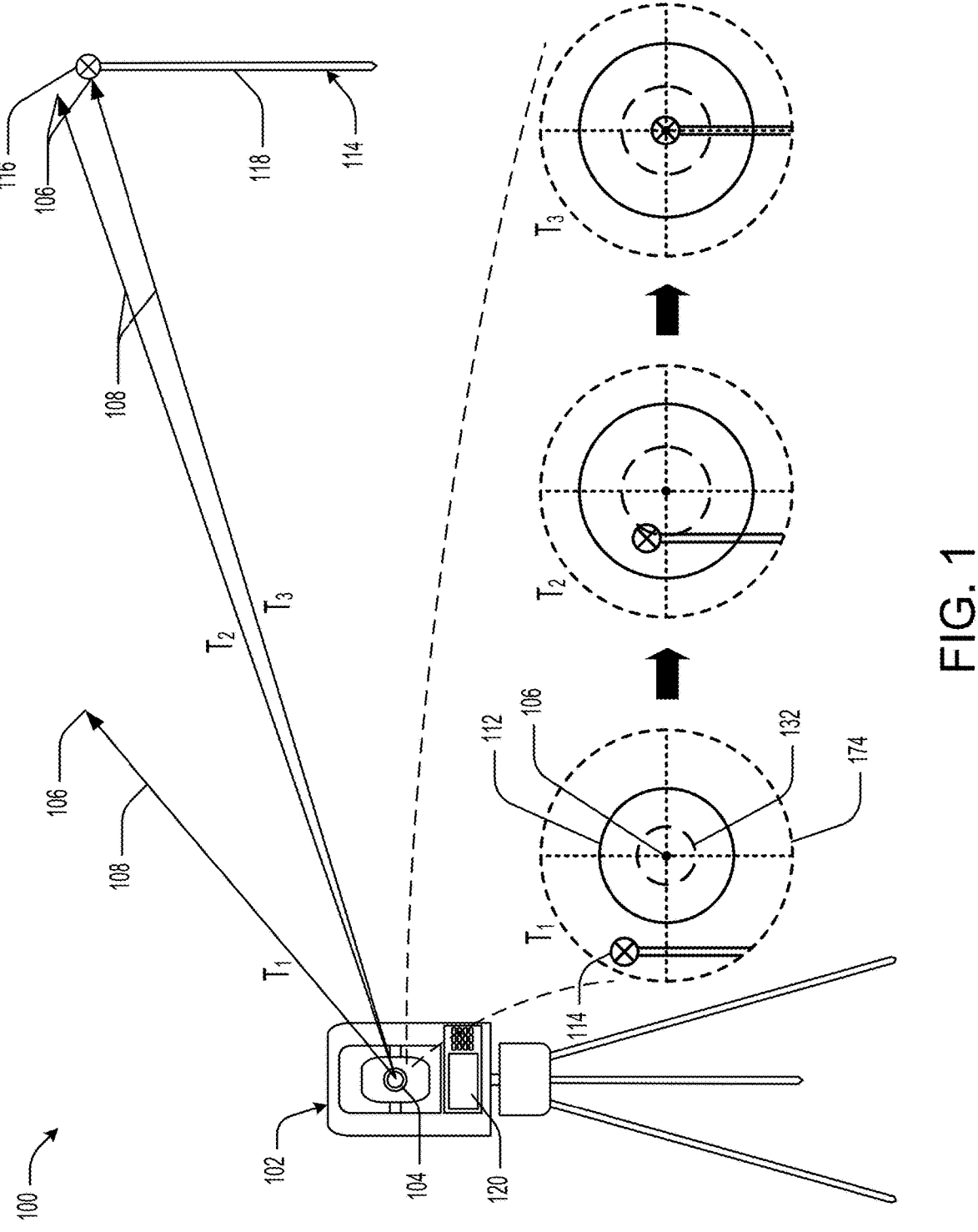
FIG. 1 illustrates an example of a total station deployed at a site.

In many situations, a robotic total station (RTS) is preferred over the conventional mechanical total station (MTS). This is due in part to the MTS lacking several features of the RTS, such as rotary actuators and object tracking circuitry to automatically align the RTS's optical aiming point with a remote target. However, the RTS also has several drawbacks. For example, the RTS comes with additional complexity, weight, cost, and battery requirements compared to the MTS. For many users, the additional skill required to operate an RTS is an obstacle, and further presents opportunities for measurement errors to go undetected. As a result, these users continue to use the MTS despite the requirement of one user to operate the total station itself and another user to operate the target.

The described embodiments offer many of the advantages of the RTS but without some of the above-noted drawbacks, such as increased complexity and cost. Some embodiments of the present disclosure relate to a geodetic instrument, alternatively referred to as a total station, that includes a tracking system that can perform tracking without the additional reflective optical elements that are typically needed in an RTS. For a conventional RTS, reflective optical elements are used by the tracking system to enable the light emitter to emit and the light sensor to receive along the telescope's optical aiming axis. These optical elements impose additional complexity and cost for the RTS. However, the coaxial arrangement between the tracker axis and the optical aiming axis ensures that the tracking system is aligning the telescope to the correct point.

Embodiments of the present disclosure overcome the typical drawbacks of non-coaxial arrangements by employing two independent single-axis trackers, one that is horizontally-offset and another that is vertically-offset from the optical aiming axis of the telescope, thereby reducing the cost and complexity of the main optical path design. Instead of using the slope distance (as measured by an electronic distance measurement (EDM) device) to correct for the off-axis measurements, embodiments use horizontally-offset measurements, which are subject to horizontal errors, to determine the needed vertical rotation and vertically-offset measurements, which are subject to vertical errors, to determine the needed horizontal rotation. Upon determining the needed rotations, a user can manually make these rotations or they may be made automatically using rotary actuators that rotate the center unit holding the telescope to achieve the alignment. Accordingly, embodiments of the present disclosure can be used in an MTS or RTS implementation.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

The figures herein follow a numbering convention in which the first digit or digits correspond to the figure number and the remaining digits identify an element or component in the figure. Similar elements or components between different figures may be identified by the use of similar digits. For example, 102 may reference element "02" in FIG. 1, and a similar element may be referenced as 202 in FIG. 2. As will be appreciated, elements shown in the various embodiments herein can be added, exchanged, and eliminated so as to provide a number of additional embodiments of the present disclosure. In addition, the proportion and the relative scale of the elements provided in the figures are intended to illustrate certain embodiments of the present disclosure and should not be taken in a limiting sense.

FIG. 1 illustrates an example of a total station 102 deployed at a site 100, in accordance with some embodiments of the present disclosure. Total station 102 may be an RTS or an MTS. Site 100 may be a construction site or a surveying site, among other possibilities. In addition to total station 102, a target 114 that is remote from total station 102 may be deployed at site 100. Target 114 may include a reflector 116, such as a prism, that is mounted on top of a pole 118. Reflector 116 may reflect light coming from total station 102 back toward total station 102. In some instances, a first user may operate total station 102 and a second user may operate target 114 by, for example, holding target 114 in a vertical position and (optionally) facing reflector 116 toward total station 102.

As illustrated in FIG. 1, during operation, a telescope 104 of total station 102 may be oriented such that an optical aiming axis 108 and an optical aiming point 106 associated with telescope 104 are far from target 114 at time $T_1$. For example, the user of total station 102 may orient telescope 104 in roughly the general direction of target 114 without looking through the sight of telescope 104 or observing the total station's digital display. Further at time $T_1$, a telescope field of view (FOV) 112 centered along optical path and optical aiming point 106 may show that target 114 is not in view. Optionally, a digital frame may be displayed at display 120 that shows a digitized version of telescope FOV 112.

In some examples, total station 102 may include a tracking system (or simply, "tracker") that can automatically locate, follow, and lock optical aiming point 106 onto target 114. At time $T_1$, target 114 is within a tracker FOV 174 so that the tracker can detect target 114 and determine what horizontal and/or vertical rotations need to be made to align optical aiming point 106 with target 114. Total station 102 may also include an EDM unit that measures distances between total station 102 and a target point, such as target 114. The EDM unit may have an EDM FOV 132 that corresponds to the area of detection for the EDM unit such that, if reflector 116 of target 114 is at least partially within EDM FOV 132 (as shown at time $T_2$ and $T_3$), the EDM unit may be capable of detecting the distance to target 114.

As shown in FIG. 1, the tracking system in total station 102 has a wider FOV than the telescope and the EDM, allowing the tracker to bring target 114 into telescope FOV 112 and EDM FOV 132. The EDM system's FOV is narrower because it needs to focus on specific targets, and not any surrounding objects, for accurate distance measurements. Telescope 104 is used for sighting and aiming at target 114. Its FOV is typically wider than the EDM but narrower than the tracker, allowing the surveyor or operator to see the target through the telescope and, optionally, manually aim the total station at the desired point.

In some examples, total station 102 can include motors or other actuators that use the tracking data gathered by the tracker to horizontally and/or vertically rotate the center unit of total station 102 to align optical aiming axis 108 with target 114. In some examples, total station 102 may optionally include such motors and may instead provide instructions on display 120 for how an operator can manually horizontally and/or vertically rotate the center unit of total station 102 to align optical aiming axis 108 with target 114. Such alignment is shown at time $T_3$.

Figure 2:
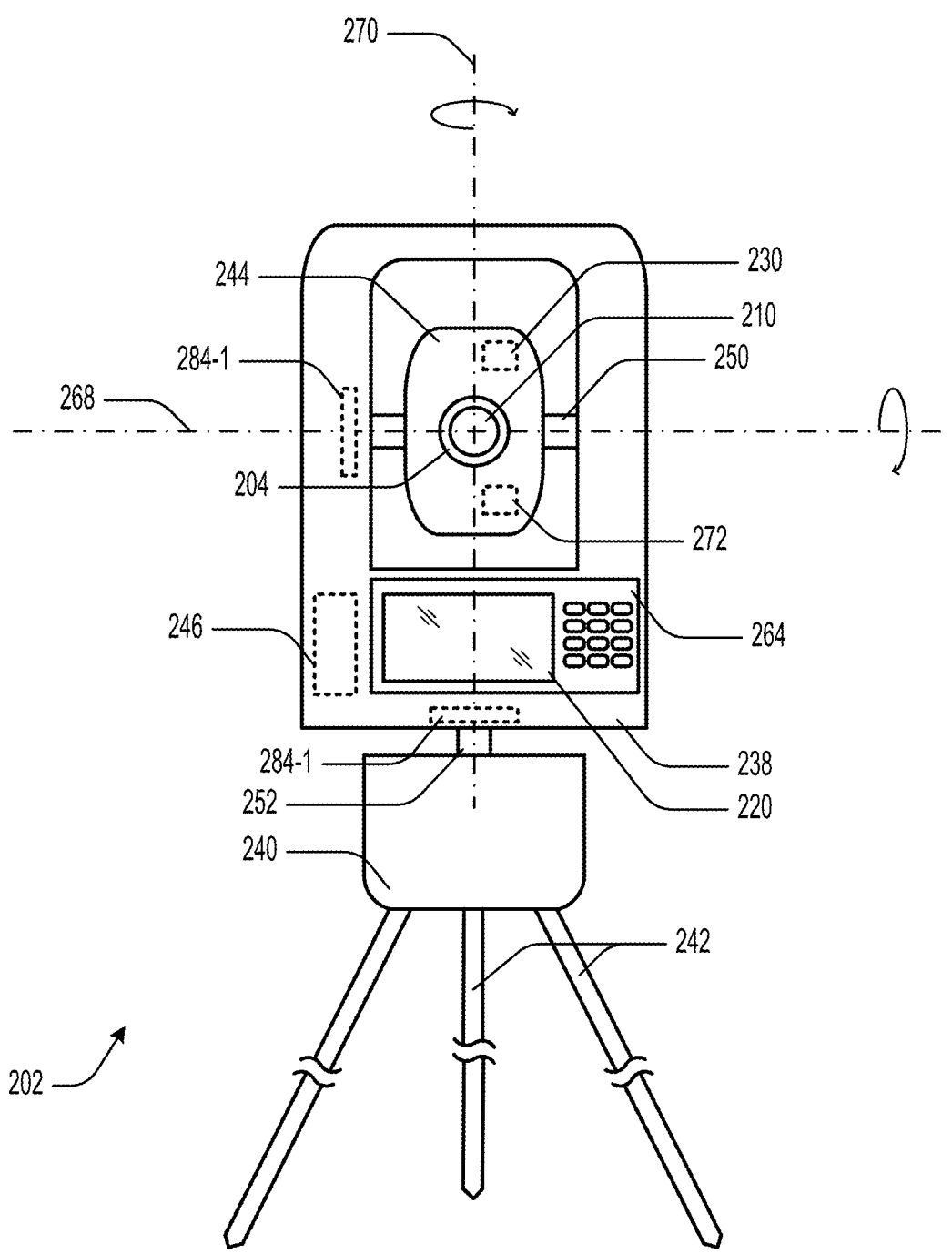
FIG. 2 illustrates an example schematic diagram of a total station.

FIG. 2 illustrates an example schematic diagram of a total station 202, in accordance with some embodiments of the present disclosure. Total station 202 may include a base 240, an alidade 238 mounted on base 240 via a vertical rotatable connection 252 for rotation about a vertical axis 270, and a center unit 244 mounted on alidade 238 via a horizontal rotatable connection 250 for rotation about a horizontal axis 268. Total station 202 may further include an onboard computer 246 that is communicatively coupled to an EDM unit 230, tracker 272, a display 220, and an interface 264. Onboard computer 246 may include one or more processors, memory units, and other electronics to support the receiving, processing, and outputting of various types of signals and data. While onboard computer 246 is shown as being arranged in alidade 238, it can be located elsewhere in total station 202 (e.g., in base 240) depending on the specific implementation, provided it remains communicatively coupled with the above-listed components.

In some embodiments, center unit 244 may include a telescope 204 having an optical aiming axis (alternatively referred to as a "sighting axis", "visual aiming axis", "optical path"). Telescope 204 may include a sight 210 (or eyepiece) through which a user may observe an optical aiming point identified by crosshairs or reticles. Optionally, telescope 204 may include lenses, mirrors, or other optical structures that allow distant objects to be magnified as observed by the user, while in some embodiments such magnification may not be present. Center unit 244 may also include EDM unit 230, which may be integrated with telescope 204 such that EDM unit 230 may emit light (e.g., infrared light, visible light, etc.) through the front lens of telescope 204 along the optical aiming axis of telescope 204 and receive reflected light through the front lens of telescope 204. The comparison of the received signal to the emitted signal allows EDM unit 230 to determine the distance between total station 202 and the target with high accuracy. This distance may alternatively be referred to as the slope distance.

In some embodiments, center unit 244 may also include a tracking system having one or more trackers 272 that include emitters, sensors, processing capabilities, and rotary actuators 284 (e.g., electric motors) to automatically follow and continuously measure a moving target. The tracking system may first lock onto the target using rotary actuators 284-1 and 284-2 to respectively horizontally and/or vertically rotate until the optical aiming axis of telescope 204 is aligned with the target. Once locked, the tracking system continuously adjusts the instrument's orientation to keep the optical aiming axis aligned with the moving target. This ensures that the total station can continually measure angles and distances to the target, even if the target is in motion. The tracking system, in conjunction with the EDM capabilities, allows for automatic data collection. This is particularly useful in applications such as monitoring, construction layout, and surveying tasks involving moving objects or dynamic environments. In some examples, tracker 272 and/or EDM unit 230 can be controlled remotely by the surveyor using a controller or software interface. This enables the surveyor to operate the total station and track the target from a distance.

Figure 3:
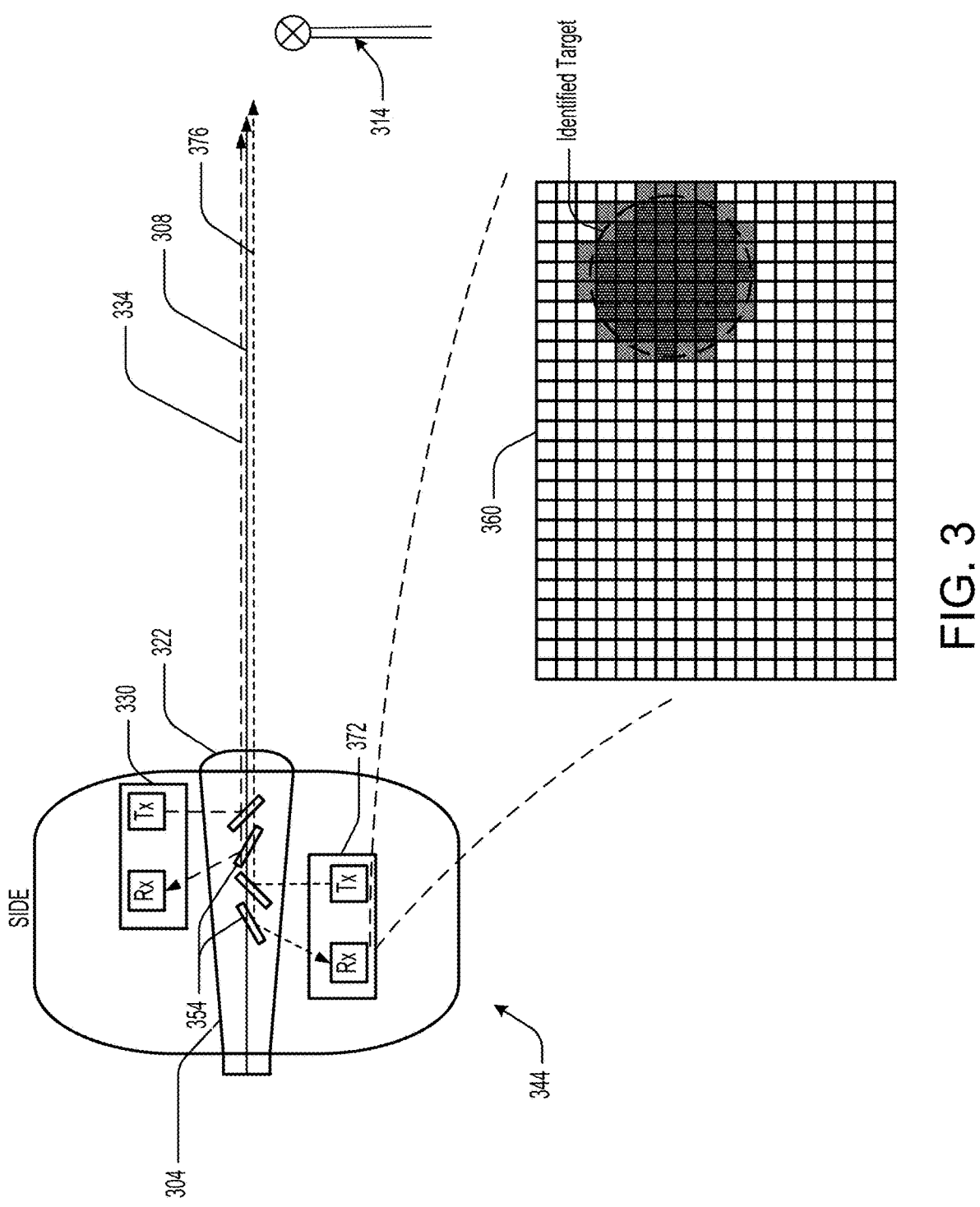
FIG. 3 illustrates an example operation of a total system having aiming, EDM, and tracker axes that are coaxial.

FIG. 3 illustrates an example operation of a total system having aiming, EDM, and tracker axes that are coaxial, in accordance with some embodiments of the present disclosure. FIG. 3 depicts a side view of a center unit 344 including a telescope 304, an EDM unit 330, and a tracker 372, where telescope 304 defines an optical aiming axis 308, EDM unit 330 defines an EDM axis 334, and tracker 372 defines a tracker axis 376. To ensure that these axes are coaxial, both EDM unit 330 and tracker 372 may utilize reflective optical elements 354 disposed within telescope 304 along optical aiming axis 308. These elements can include mirrors, beam splitters, or lenses. Both EDM unit 330 and tracker 372 include transmitters/emitters ("Tx") and receivers/sensors ("Rx") to respectively transmit and receive light.

In some examples, EDM unit 330 may utilize reflective optical elements 354 to transmit and receive a laser or infrared light beam via a front lens 322 of telescope 304 so that the distance measurement corresponds to the optical aiming point. This alignment ensures that the emitted and received beams travel along the same path, hitting target 314 and returning along the same axis. EDM unit 330 then measures the time it takes for the light to travel to the target and return, calculating the distance based on the speed of light. In some examples, the tracking system can utilize reflective optical elements 354 to continuously aim at a target by monitoring the reflection of its laser or optical beam from target 314. Since tracker axis 376 is coaxial with optical aiming axis 308, tracker axis 376 need not account for an offset between the two and can align target 314 directly with its own axis.

In the illustrated example, tracker 372 receives a 2D matrix of light values 360 represented across multiple horizontal and vertical positions. For example, the sensor of tracker 372 may be a 2D pixelated image sensor that measures light values across the horizontal and vertical positions. Matrix of light values 360 may be analyzed to determine a horizontal position and a vertical position of target 314. These positions are compared to the center of the optical aiming axis 308 to compute corrective rotations (e.g., angles) that are to be applied to center unit 344. In the illustrated example, an upward vertical rotation and a rightward horizontal rotation are needed to align target 314 with tracker axis 376.

Figure 4:
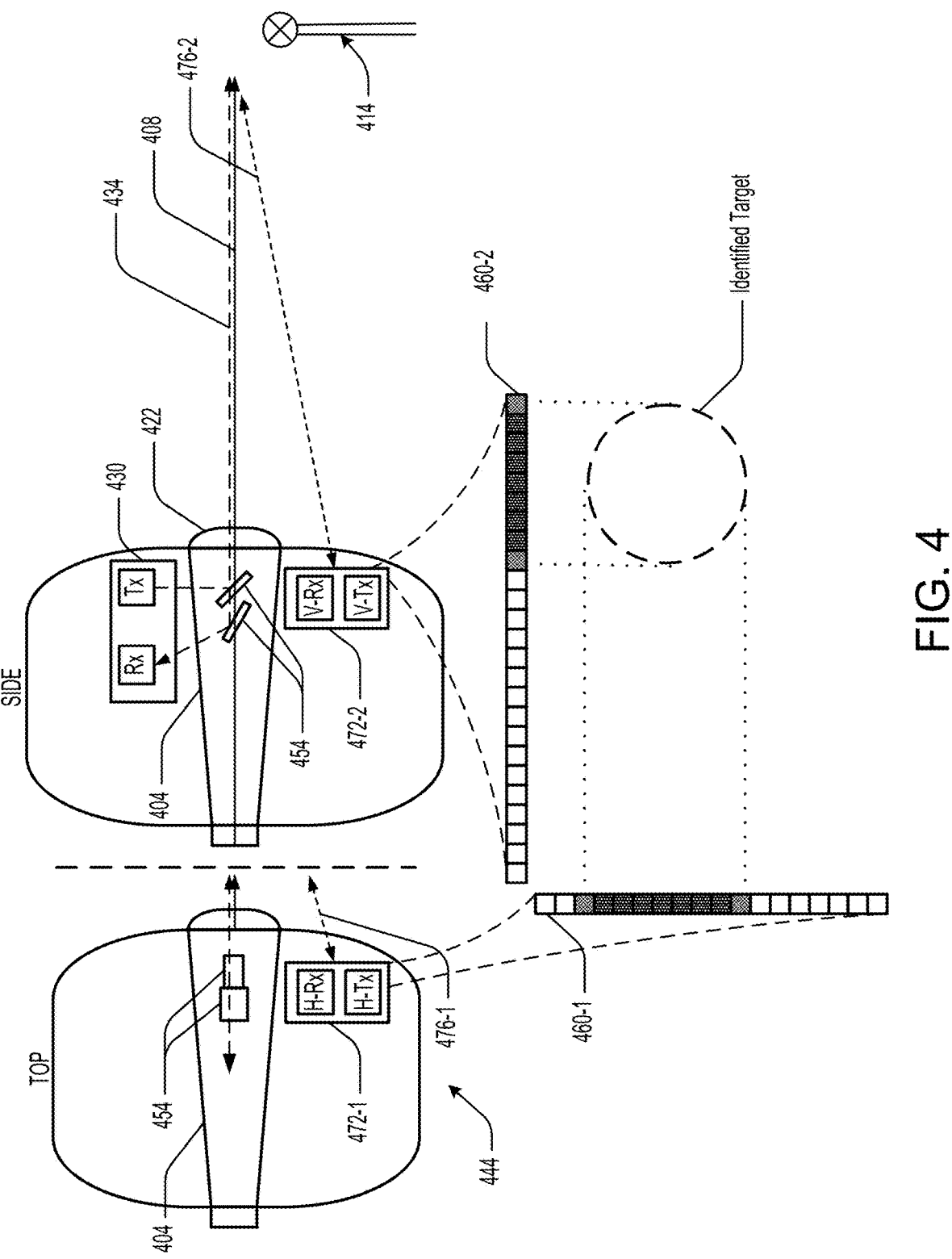
FIG. 4 illustrates an example operation of a total system having a tracking system with two independent single-axis trackers.

FIG. 4 illustrates an example operation of a total system having a tracking system with two independent single-axis trackers, in accordance with some embodiments of the present disclosure. FIG. 4 depicts top (left schematic) and side (right schematic) views of a center unit 444 including a telescope 404, an EDM unit 430, and a tracking system with trackers 472 including a horizontally-offset tracker 472-1 and a vertically-offset tracker 472-2. In the illustrated example, neither of tracker axes 476-1 and 476-2 respectively defined by trackers 472-1 and 472-2 are coaxial with an EDM axis 434 defined by EDM unit 430 and an optical aiming axis 408 formed by telescope 404.

Similar to EDM unit 330 described in FIG. 3, EDM unit 430 utilizes reflective optical elements 454 (e.g., mirrors, beam splitters, lenses, etc.) disposed within telescope 404 along optical aiming axis 408 to transmit and receive a laser or infrared light beam via a front lens 422 of telescope 404 so that the distance measurement corresponds to the optical aiming point. EDM unit 430 then measures the delay for the light to travel to the target and return, calculating the distance using the delay and the speed of light. In the illustrated example, both optical aiming axis 408 and EDM axis 434 pass through a center of front lens 422 (i.e., a horizontally and vertically centered point of front lens 422).

Trackers 472 each include a transmitter/emitter ("Tx") and a receiver/sensor ("Rx") to respectively transmit and receive light, such as infrared light or laser light. In the illustrated example, a horizontally-offset transmitter/emitter ("H-Tx") of tracker 472-1 emits light along tracker axis 476-1 over a FOV and a horizontally-offset receiver/sensor ("H-Rx") of tracker 472-1 receives and detects the light after having been reflected off of a target 414. The horizontally-offset sensor can generate a matrix of light values 460-1 based on the received light over a range of vertical positions. Matrix of light values 460-1 may be a 1D matrix (such as in the illustrated example) or a 2D matrix that is then aggregated (summed or averaged) across columns to obtain a 1D matrix. As a 1D matrix, each light value of the matrix of light values 460-1 corresponds to a different vertical position, allowing the vertical positioning of target 414 to be determined based on an identified grouping of values.

In the illustrated example, a vertically-offset transmitter/emitter ("V-Tx") of tracker 472-2 emits light along tracker axis 476-2 over a FOV and a vertically-offset receiver/sensor ("V-Rx") of tracker 472-2 receives and detects the light after having been reflected off of target 414. The vertically-offset sensor can generate a matrix of light values 460-2 based on the received light over a range of horizontal positions. Matrix of light values 460-2 may be a 1D matrix (such as in the illustrated example) or a 2D matrix that is then aggregated (summed or averaged) across rows to obtain a 1D matrix. As a 1D matrix, each light value of the matrix of light values 460-2 corresponds to a different horizontal position, allowing the horizontal positioning of target 414 to be determined based on an identified grouping of values. As shown in FIG. 4, the determined vertical and horizontal positionings can be combined to find the overall position of the identified target.

In some examples, matrices of light values 460 can be analyzed using a computer processor contained within the tracking system or residing elsewhere in the total station. For example, one or processors may be included in trackers 472 or in the onboard computer. Such analysis may include computing corrective rotations needed for aligning optical aiming axis 408 with target 414, with vertical corrective rotations computed using matrix of light values 460-1 and horizontal corrective rotations computed using matrix of light values 460-2. Once computed, the processor may send control signals to the rotary actuators to perform the corrective rotations, with the vertical corrective rotations sent to the vertical rotary actuator and the horizontal corrective rotations sent to the horizontal rotary actuator.

Figures 5, 6:
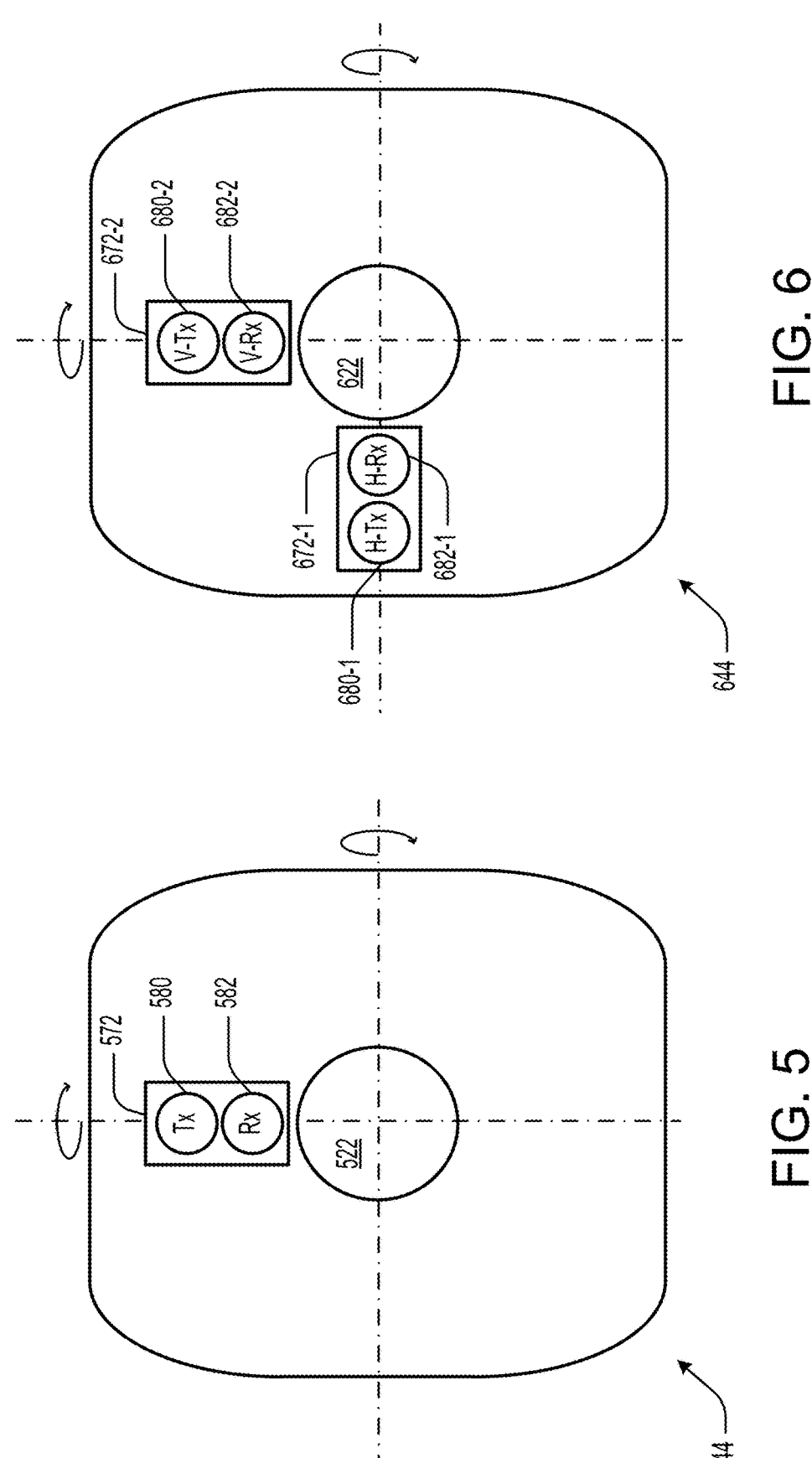
FIG. 5 illustrates an example arrangement of a dual-axis tracker in a center unit of a total station.
FIG. 6 illustrates an example arrangement of independent single-axis trackers in a center unit of a total station.

FIG. 5 illustrates an example arrangement of a dual-axis tracker 572 in a center unit 544 of a total station, in accordance with some embodiments of the present disclosure. Tracker 572 includes a emitter 580 ("Tx") disposed above front lens 522 and a sensor 582 ("Rx") disposed above front lens 522, with emitter 580 being further from the center of front lens 522 compared to sensor 582.

FIG. 6 illustrates an example arrangement of independent single-axis trackers 672 in a center unit 644 of a total station, in accordance with some embodiments of the present disclosure. A first tracker 672-1 includes a horizontally-offset emitter 680-1 ("H-Tx") disposed to the left of and vertically aligned with the center of front lens 622, and a horizontally-offset sensor 682-1 ("H-Rx") disposed to the left of and vertically aligned with the center of front lens 622, with horizontally-offset emitter 680-1 being further from the center of front lens 622 compared to horizontally-offset sensor 682-1. A second tracker 672-2 includes a vertically-offset emitter 680-2 ("V-Tx") disposed above and horizontally aligned with the center of front lens 622 and a vertically-offset sensor 682-2 ("V-Rx") disposed above and horizontally aligned with the center of front lens 622, with vertically-offset emitter 680-2 being further from the center of front lens 622 compared to vertically-offset sensor 682-2.

Figures 7, 8:
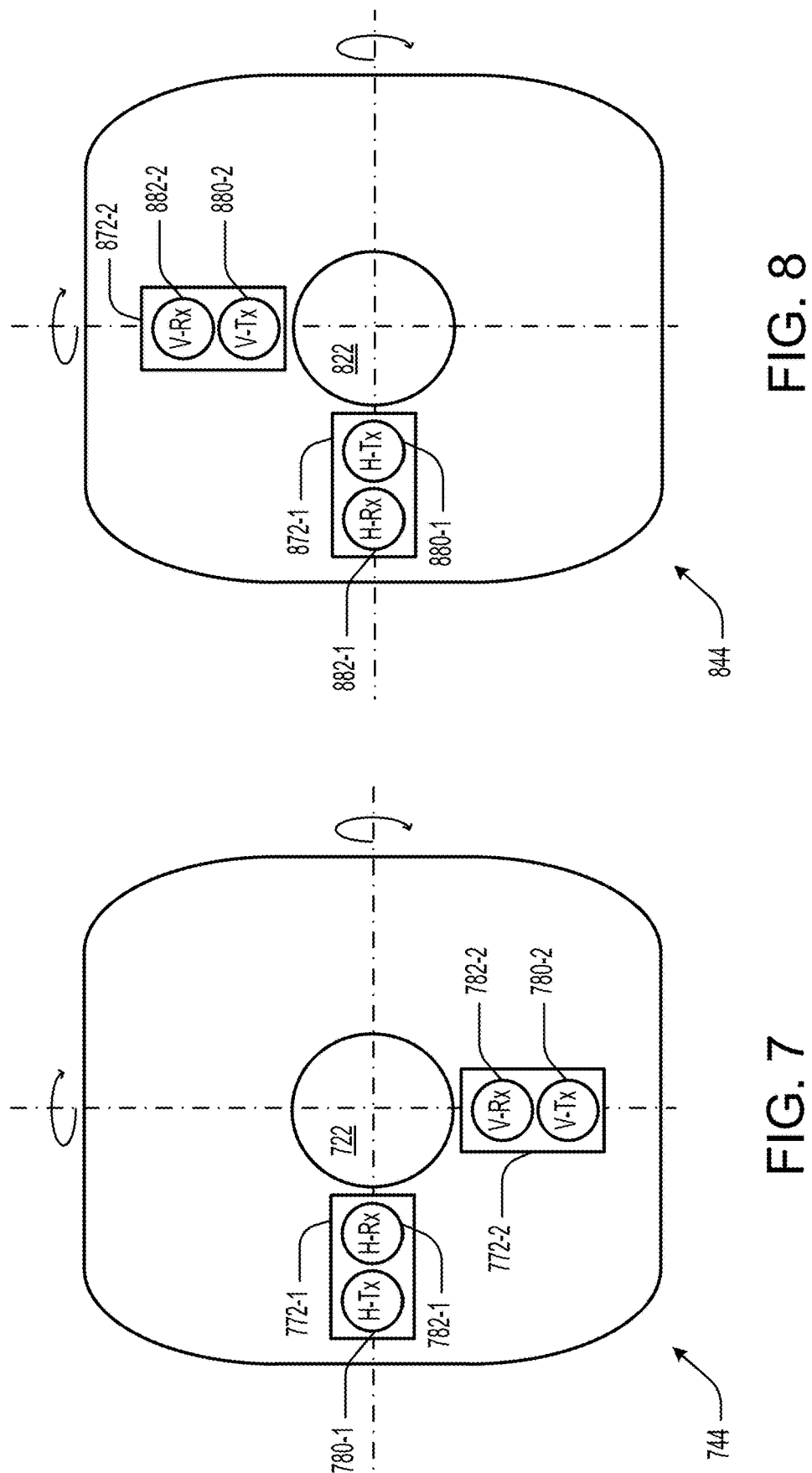
FIG. 7 illustrates an example arrangement of independent single-axis trackers in a center unit of a total station.
FIG. 8 illustrates an example arrangement of independent single-axis trackers in a center unit of a total station.

FIG. 7 illustrates an example arrangement of independent single-axis trackers 772 in a center unit 744 of a total station, in accordance with some embodiments of the present disclosure. A first tracker 772-1 includes a horizontally-offset emitter 780-1 ("H-Tx") disposed to the left of and vertically aligned with the center of front lens 722, and a horizontally-offset sensor 782-1 ("H-Rx") disposed to the left of and vertically aligned with the center of front lens 722, with horizontally-offset emitter 780-1 being further from the center of front lens 722 compared to horizontally-offset sensor 782-1. A second tracker 772-2 includes a vertically-offset emitter 780-2 ("V-Tx") disposed below and horizontally aligned with the center of front lens 722 and a vertically-offset sensor 782-2 ("V-Rx") disposed below and horizontally aligned with the center of front lens 722, with vertically-offset emitter 780-2 being further from the center of front lens 722 compared to vertically-offset sensor 782-2.

FIG. 8 illustrates an example arrangement of independent single-axis trackers 872 in a center unit 844 of a total station, in accordance with some embodiments of the present disclosure. A first tracker 872-1 includes a horizontally-offset emitter 880-1 ("H-Tx") disposed to the left of and vertically aligned with the center of front lens 822, and a horizontally-offset sensor 882-1 ("H-Rx") disposed to the left of and vertically aligned with the center of front lens 822, with horizontally-offset sensor 882-1 being further from the center of front lens 822 compared to horizontally-offset emitter 880-1. A second tracker 872-2 includes a vertically-offset emitter 880-2 ("V-Tx") disposed above and horizontally aligned with the center of front lens 822 and a vertically-offset sensor 882-2 ("V-Rx") disposed above and horizontally aligned with the center of front lens 822, with vertically-offset sensor 882-2 being further from the center of front lens 822 compared to vertically-offset emitter 880-2.

Figures 9, 10:
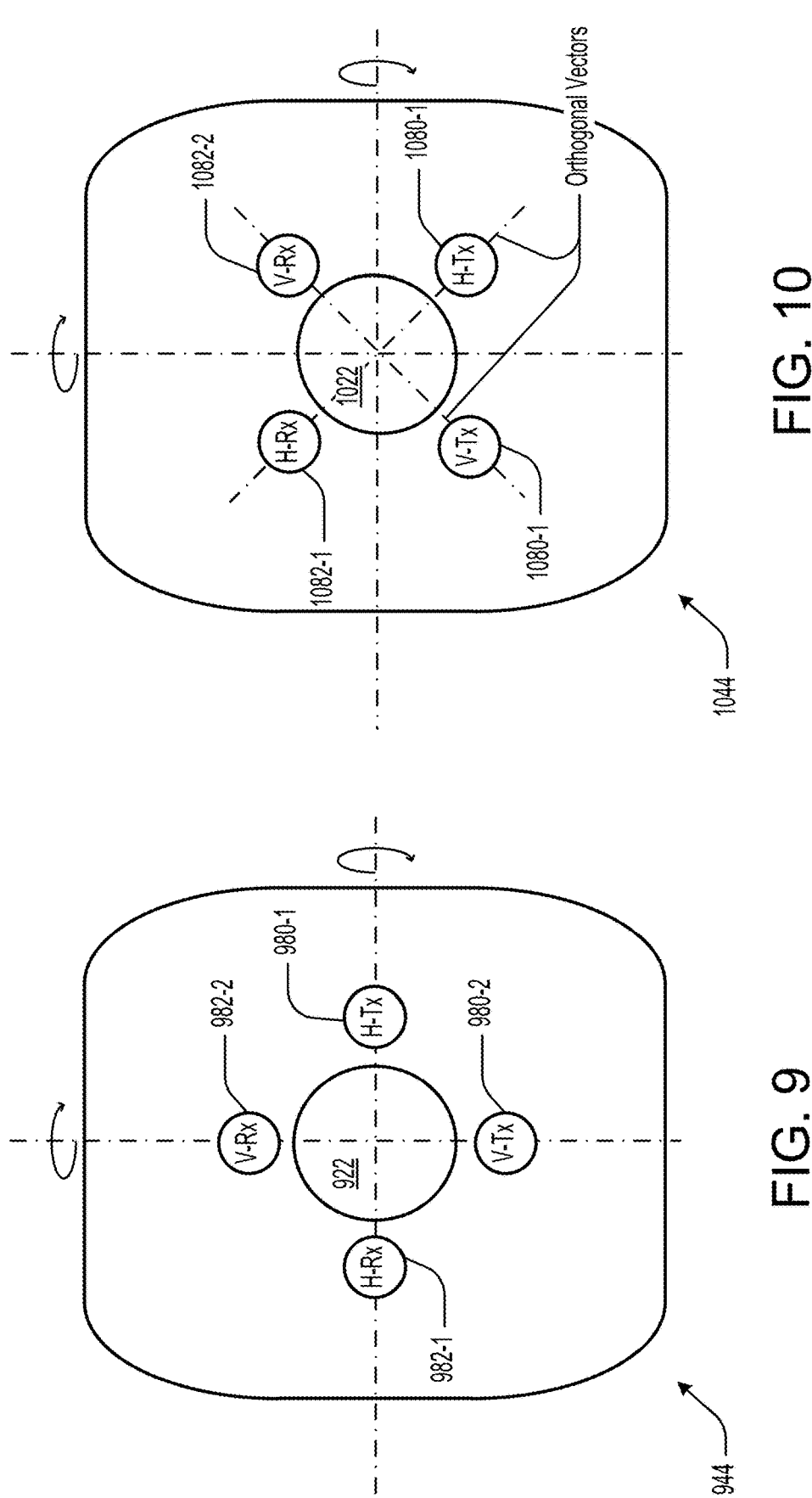
FIG. 9 illustrates an example arrangement of independent single-axis trackers in a center unit of a total station.
FIG. 10 illustrates an example arrangement of independent single-axis trackers in a center unit of a total station.

FIG. 9 illustrates an example arrangement of independent single-axis trackers in a center unit 944 of a total station, in accordance with some embodiments of the present disclosure. A first tracker includes a horizontally-offset emitter 980-1 ("H-Tx") disposed to the right of and vertically aligned with the center of front lens 922, and a horizontally-offset sensor 982-1 ("H-Rx") disposed to the left of and vertically aligned with the center of front lens 922, with horizontally-offset sensor 982-1 and horizontally-offset emitter 980-1 being disposed on opposite sides of front lens 922. A second tracker includes a vertically-offset emitter 980-2 ("V-Tx") disposed below and horizontally aligned with the center of front lens 922 and a vertically-offset sensor 982-2 ("V-Rx") disposed above and horizontally aligned with the center of front lens 922, with vertically-offset sensor 982-2 and vertically-offset emitter 980-2 being disposed on opposite sides of front lens 922.

FIG. 10 illustrates an example arrangement of independent single-axis trackers in a center unit 1044 of a total station, in accordance with some embodiments of the present disclosure. A first tracker includes a horizontally-offset emitter 1080-1 ("H-Tx") disposed to the right of the center of front lens 1022, and a horizontally-offset sensor 1082-1 ("H-Rx") disposed to the left of the center of front lens 1022, with horizontally-offset sensor 1082-1 and horizontally-offset emitter 1080-1 being disposed on opposite sides of front lens 1022. A second tracker includes a vertically-offset emitter 1080-2 ("V-Tx") disposed below the center of front lens 1022 and a vertically-offset sensor 1082-2 ("V-Rx") disposed above the center of front lens 1022, with vertically-offset sensor 1082-2 and vertically-offset emitter 1080-2 being disposed on opposite sides of front lens 1022.

In the example arrangement shown in FIG. 10, a first axis formed between horizontally-offset emitter 1080-1 and horizontally-offset sensor 1082-1 is orthogonal to a second axis formed between vertically-offset emitter 1080-2 and vertically-offset sensor 1082-2, with the first and second axes being a 45° clockwise rotated versions of the horizontal and vertical axes (the first and second axes optionally referred to as first and second lateral directions). While the illustrated example shows a 45° clockwise rotated version, other rotated versions of the horizontal and vertical axes can be used (e.g., 15°, 30°, 60°, 75°, 90°, 105°, etc.). Furthermore, in some examples, the first and second axis need not be orthogonal to each other, and may instead form an angle other than 90° between each other, such as 40°, 50°, 60°, 70°, or 80°.

Figure 11:
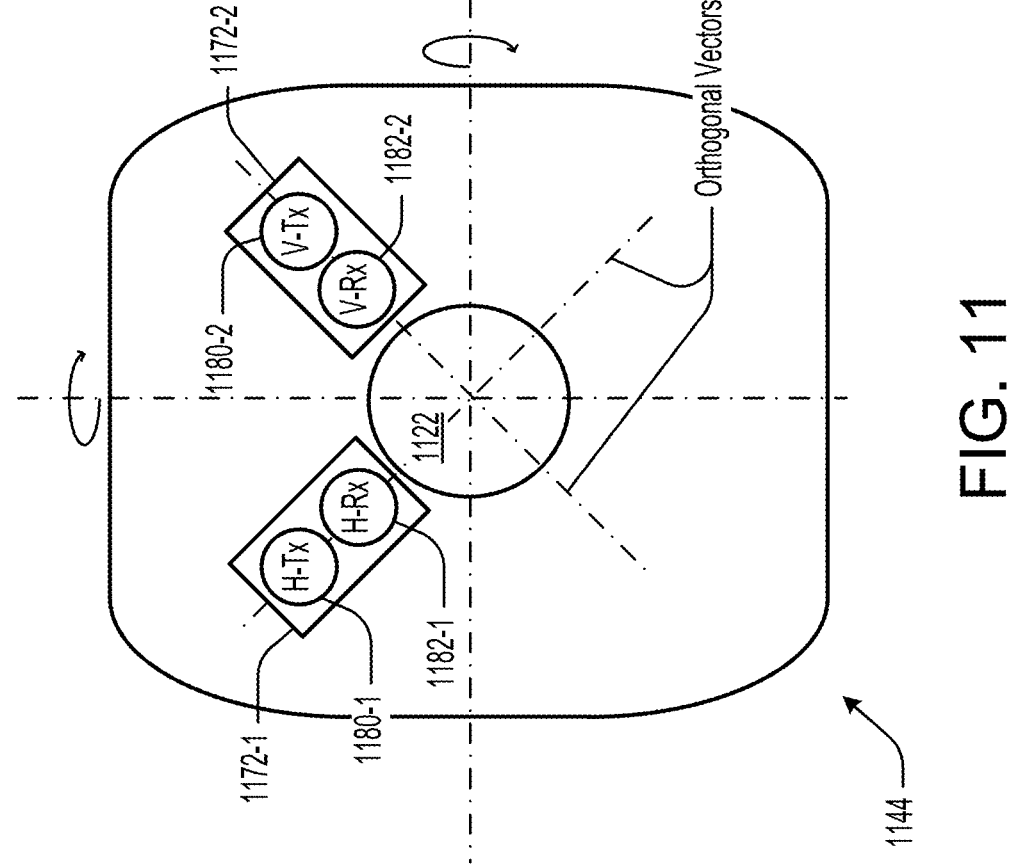
FIG. 11 illustrates an example arrangement of independent single-axis trackers in a center unit of a total station.

FIG. 11 illustrates an example arrangement of independent single-axis trackers 1172 in a center unit 1144 of a total station, in accordance with some embodiments of the present disclosure. A first tracker 1172-1 includes a horizontally-offset emitter 1180-1 ("H-Tx") disposed to the left and above the center of front lens 1122, and a horizontally-offset sensor 1182-1 ("H-Rx") disposed to the left and above the center of front lens 1122, with horizontally-offset emitter 1180-1 being further from the center of front lens 1122 compared to horizontally-offset sensor 1182-1. A second tracker 1172-2 includes a vertically-offset emitter 1180-2 ("V-Tx") disposed to the right and above the center of front lens 1122 and a vertically-offset sensor 1182-2 ("V-Rx") disposed to the right and above the center of front lens 1122, with vertically-offset emitter 1180-2 being further from the center of front lens 1122 compared to vertically-offset sensor 1182-2.

In the example arrangement shown in FIG. 11, a first axis formed between horizontally-offset emitter 1180-1 and horizontally-offset sensor 1182-1 is orthogonal to a second axis formed between vertically-offset emitter 1180-2 and verti-cally-offset sensor 1182-2, with the first and second axes being a 45° clockwise rotated versions of the horizontal and vertical axes (the first and second axes optionally referred to as first and second lateral directions, and the rotation point being the center of front lens 1122). While the illustrated example shows a 45° clockwise rotated version, other rotated versions of the horizontal and vertical axes can be used (e.g., 15°, 30°, 60°, 75°, 90°, 105°, etc.). Furthermore, in some examples, the first and second axis need not be orthogonal to each other, and may instead form an angle other than 90° between each other, such as 40°, 50°, 60°, 70°, or 80°.

FIG. 12 illustrates an example method 1200, in accordance with some embodiments of the present disclosure. One or more steps of method 1200 may be omitted during performance of method 1200, and steps of method 1200 may be performed in any order and/or in parallel. One or more steps of method 1200 may be performed by one or more processors, such as those included in an onboard computer (e.g., onboard computer 246). Method 1200 may be implemented as a computer-readable medium or computer program product comprising instructions which, when the program is executed by one or more computers, cause the one or more computers to carry out the steps of method 1200.

Method 1200 may be a method of operating a geodetic apparatus, such as a total station (e.g., total stations 102, 202). The geodetic apparatus may include a telescope (e.g., telescopes 104, 204, 304, 404) defining an optical aiming axis (e.g., optical aiming axes 108, 308, 408). The telescope may include a front lens (e.g., front lenses 322, 422, 522, 622, 722, 822, 922, 1022, 1122). The geodetic apparatus may include an EDM unit (e.g., EDM units 230, 330, 430) defining an EDM axis (e.g., EDM axes 334, 434). The geodetic apparatus may include a tracking system comprising first and second single-axis trackers (e.g., trackers 272, 372, 472, 572, 672, 772, 872, 1172). The first tracker may include a first emitter (e.g., emitters 680-1, 780-1, 880-1, 980-1, 1080-1, 1180-1) and a first sensor (e.g., sensors 682-1, 782-1, 882-1, 982-1, 1082-1, 1182-1). The second tracker may include a second emitter (e.g., emitters 680-2, 780-2, 880-2, 980-2, 1080-2, 1180-2) and a second sensor (e.g., sensors 682-2, 782-2, 882-2, 982-2, 1082-2, 1182-2).

At step 1202, the first emitter transmits first light toward a target (e.g., targets 114, 314, 414). The target may include a reflector (e.g., reflector 116) and a pole (e.g., pole 118). The first emitter may be horizontally offset from a center of the front lens. The first emitter may be vertically aligned with the center of the front lens.

At step 1204, the first sensor receives the first light after the first light reflects off the target. The first sensor may be horizontally offset from the center of the front lens. The first sensor may be vertically aligned with the center of the front lens.

At step 1206, the second emitter transmits second light toward the target. The second emitter may be vertically offset from the center of the front lens. The second emitter may be horizontally aligned with the center of the front lens.

At step 1208, the second sensor receives the second light after the second light reflects off the target. The second sensor may be vertically offset from the center of the front lens. The second emitter may be horizontally aligned with the center of the front lens.

At step 1210, a processor computes one or more corrective rotations for aligning an axis with the target based on the received first light and the received second light. The axis may be the optical aiming axis and/or the EDM axis. The one or more corrective rotations may include a horizontal corrective rotation and/or a vertical corrective rotation. Each corrective rotation may include an angle (horizontal or vertical) by which the telescope is to be rotated. The processor may be part of an onboard computer (e.g., onboard computer 246). In some examples, step 1210 may include one or more of steps 1212 to 1216.

At step 1212, the processor obtains a first matrix of light values (e.g., matrix of light values 460-1) based on the received first light. The first matrix of light values may be a 1D matrix where different values correspond to different vertical positions. Alternatively, the first matrix of light values may be a 2D matrix where different values correspond to the different vertical positions and different horizontal positions. Further at step 1212, the processor obtains a second matrix of light values (e.g., matrix of light values 460-2) based on the received second light. The second matrix of light values may be a 1D matrix where different values correspond to different horizontal positions. Alternatively, the second matrix of light values may be a 2D matrix where different values correspond to the different horizontal positions and different vertical positions.

In some examples, if either of the first matrix of light values or the second matrix of light values is a 2D matrix, additional steps may be performed to convert the 2D matrix into a 1D matrix by aggregating across columns or rows. For example, the processor may convert the first matrix of light values from a 2D matrix with different light values corresponding to the different vertical positions and the different horizontal positions to a 1D matrix with different light values corresponding to the different vertical positions by aggregating (e.g., summing or averaging) across the different horizontal positions (i.e., across columns). The processor may convert the second matrix of light values from a 2D matrix with different light values corresponding to the different horizontal positions and the different vertical positions to a 1D matrix with different light values corresponding to the different horizontal positions by aggregating (e.g., summing or averaging) across the different vertical positions (i.e., across rows).

At step 1214, the processor locates a vertical position of the target using the first matrix of light values. Further at step 1214, the processor locates a horizontal position of the target using the second matrix of light values. The processor may, for example, identify a grouping of values that are above a particular threshold in each matrix.

At step 1216, the processor computes a vertical corrective rotation of the one or more corrective rotations based on the vertical position of the target. The processor may count the number of pixels/values between the vertical center of the 1D matrix of light values and the pixel/value for the vertical position of the target. The processor can convert the counted number of pixels/values into an angle to be vertically rotated (e.g., 5°, 10°, 15°, 20°, etc.). Further at step 1216, the processor computes a horizontal corrective rotation of the one or more corrective rotations based on the horizontal position of the target. The processor may count the number of pixels/values between the horizontal center of the 1D matrix of light values and the pixel/value for the horizontal position of the target. The processor can convert the counted number of pixels/values into an angle to be horizontal rotated (e.g., 5°, 10°, 15°, 20°, etc.).

At step 1218, optionally, one or more rotary actuators (e.g., rotary actuators 284) rotate the telescope horizontally and/or vertically by the one or more corrective rotations to align the optical aiming axis and/or the EDM axis with the target. In some examples, the processor may generate control signals that are sent to the one or more rotary actuators to cause the one or more corrective rotations to be performed. In some examples, the horizontal rotation is applied to an alidade (e.g., alidade 238) of the geodetic apparatus, and the vertical rotation is applied to a center unit (e.g., center units 244, 344, 444, 544, 644, 744, 844, 944, 1044, 1144) of the geodetic apparatus.

At step 1220, optionally, the processor generates instructions for the user to manually rotate the telescope horizontally and/or vertically by the one or more corrective rotations to align the optical aiming axis and/or the EDM axis with the target. The instructions may be presented on a display (e.g., displays 120, 220) or may be transmitted audibly using a speaker or via other means (e.g., transmitted to a portable user device).

Figure 13:
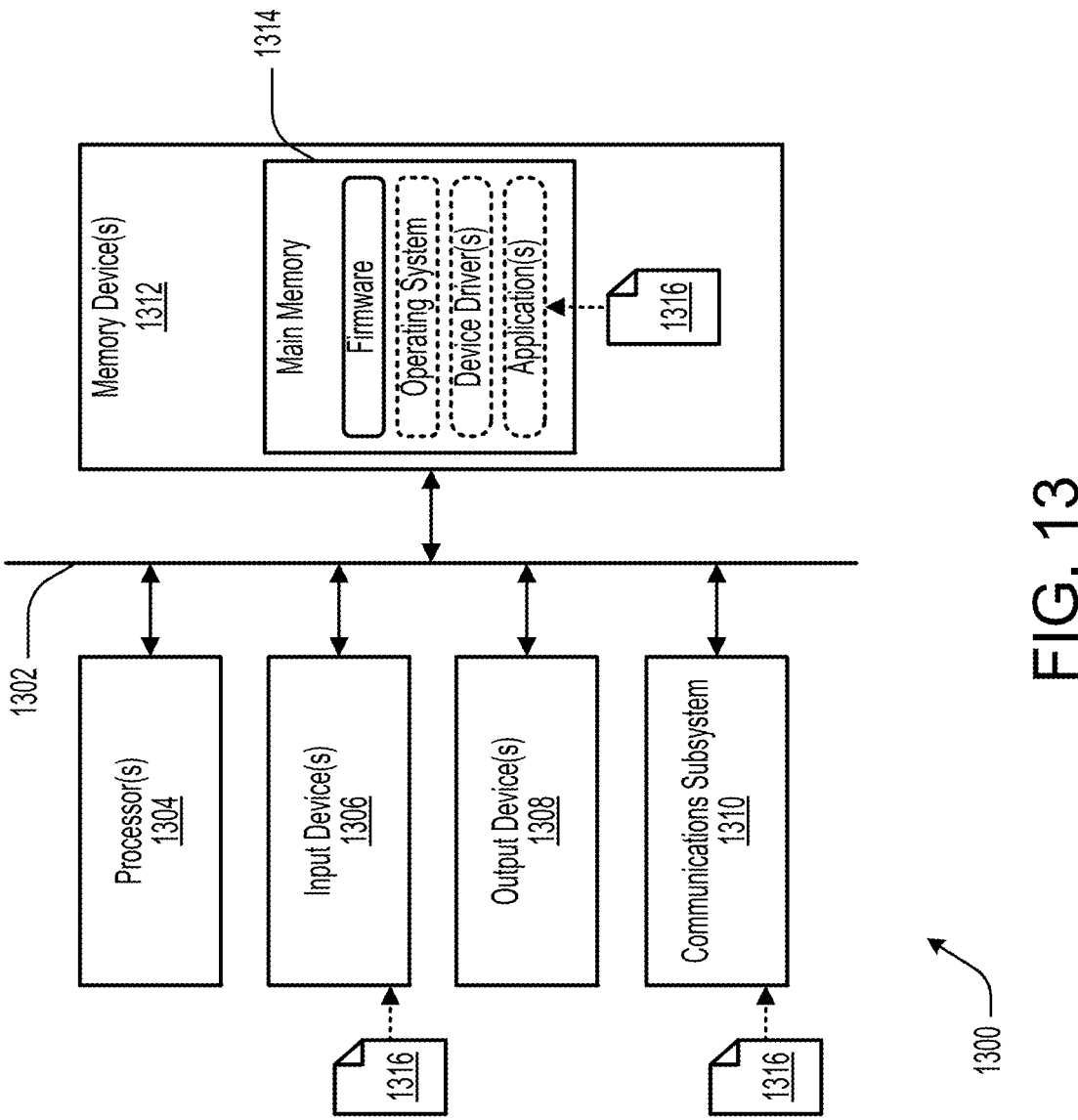
FIG. 13 illustrates an example computer system comprising various hardware elements.

FIG. 13 illustrates an example computer system 1300 comprising various hardware elements, in accordance with some embodiments of the present disclosure. Computer system 1300 may be incorporated into or integrated with devices described herein and/or may be configured to perform some or all of the steps of the methods provided by various embodiments. For example, in various embodiments, computer system 1300 may be configured to perform method 1200. It should be noted that FIG. 13 is meant only to provide a generalized illustration of various components, any or all of which may be utilized as appropriate. FIG. 13, therefore, broadly illustrates how individual system elements may be implemented in a relatively separated or relatively more integrated manner.

In the illustrated example, computer system 1300 includes a communication medium 1302, one or more processor(s) 1304, one or more input device(s) 1306, one or more output device(s) 1308, a communications subsystem 1310, and one or more memory device(s) 1312. Computer system 1300 may be implemented using various hardware implementations and embedded system technologies. For example, one or more elements of computer system 1300 may be implemented within an integrated circuit (IC), an application-specific integrated circuit (ASIC), an application-specific standard product (ASSP), a field-programmable gate array (FPGA), such as those commercially available by XILINX®, INTEL®, or LATTICE SEMICONDUCTOR®, a system-on-a-chip (SoC), a microcontroller, a printed circuit board (PCB), and/or a hybrid device, such as an SoC FPGA, among other possibilities.

The various hardware elements of computer system 1300 may be communicatively coupled via communication medium 1302. While communication medium 1302 is illustrated as a single connection for purposes of clarity, it should be understood that communication medium 1302 may include various numbers and types of communication media for transferring data between hardware elements. For example, communication medium 1302 may include one or more wires (e.g., conductive traces, paths, or leads on a PCB or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 1302 may include one or more buses that connect the pins of the hardware elements of computer system 1300. For example, communication medium 1302 may include a bus that connects processor(s) 1304 with main memory 1314, referred to as a system bus, and a bus that connects main memory 1314 with input device(s) 1306 or output device(s) 1308, referred to as an expansion bus. The system bus may itself consist of several buses, including an address bus, a data bus, and a control bus. The address bus may carry a memory address from processor(s) 1304 to the address bus circuitry associated with main memory 1314 in order for the data bus to access and carry the data contained at the memory address back to processor(s) 1304. The control bus may carry commands from processor(s) 1304 and return status signals from main memory 1314. Each bus may include multiple wires for carrying multiple bits of information and each bus may support serial or parallel transmission of data.

Processor(s) 1304 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 1304 may include one or more multi-core processors, in which each core may read and execute program instructions concurrently with the other cores, increasing speed for programs that support multithreading.

Input device(s) 1306 may include one or more of various user input devices such as a mouse, a keyboard, a microphone, as well as various sensor input devices, such as an image capture device, a temperature sensor (e.g., thermometer, thermocouple, thermistor), a pressure sensor (e.g., barometer, tactile sensor), a movement sensor (e.g., accelerometer, gyroscope, tilt sensor), a light sensor (e.g., photodiode, photodetector, charge-coupled device), and/or the like. Input device(s) 1306 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 1308 may include one or more of various devices that convert information into human-readable form, such as without limitation a display device, a speaker, a printer, a haptic or tactile device, and/or the like. Output device(s) 1308 may also include devices for writing to removable storage devices or other removable media, such as those described in reference to input device(s) 1306. Output device(s) 1308 may also include various actuators for causing physical movement of one or more components. Such actuators may be hydraulic, pneumatic, electric, and may be controlled using control signals generated by computer system 1300.

Communications subsystem 1310 may include hardware components for connecting computer system 1300 to systems or devices that are located external to computer system 1300, such as over a computer network. In various embodiments, communications subsystem 1310 may include a wired communication device coupled to one or more input/ output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 1312 may include the various data storage devices of computer system 1300. For example, memory device(s) 1312 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 1304 and memory device(s) 1312 are illustrated as being separate elements, it should be understood that processor(s) 1304 may include varying levels of on-processor memory, such as processor registers and caches that may be utilized by a single processor or shared between multiple processors.

Memory device(s) 1312 may include main memory 1314, which may be directly accessible by processor(s) 1304 via the address and data buses of communication medium 1302. For example, processor(s) 1304 may continuously read and execute instructions stored in main memory 1314. As such, various software elements may be loaded into main memory 1314 to be read and executed by processor(s) 1304 as illustrated in FIG. 13. Typically, main memory 1314 is volatile memory, which loses all data when power is turned off and accordingly needs power to preserve stored data. Main memory 1314 may further include a small portion of non-volatile memory containing software (e.g., firmware, such as BIOS) that is used for reading other software stored in memory device(s) 1312 into main memory 1314. In some embodiments, the volatile memory of main memory 1314 is implemented as RAM, such as dynamic random-access memory (DRAM), and the non-volatile memory of main memory 1314 is implemented as read-only memory (ROM), such as flash memory, erasable programmable read-only memory (EPROM), or electrically erasable programmable read-only memory (EEPROM).

Computer system 1300 may include software elements, shown as being currently located within main memory 1314, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 1316, which are executable by computer system 1300. In one example, such instructions 1316 may be received by computer system 1300 using communications subsystem 1310 (e.g., via a wireless or wired signal that carries instructions 1316), carried by communication medium 1302 to memory device(s) 1312, stored within memory device(s) 1312, read into main memory 1314, and executed by processor(s) 1304 to perform one or more steps of the described methods. In another example, instructions 1316 may be received by computer system 1300 using input device(s) 1306 (e.g., via a reader for removable media), carried by communication medium 1302 to memory device(s) 1312, stored within memory device(s) 1312, read into main memory 1314, and executed by processor(s) 1304 to perform one or more steps of the described methods.

In some embodiments of the present disclosure, instructions 1316 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 1300. For example, the non-transitory computer-readable medium may be one of memory device(s) 1312 (as shown in FIG. 13). In some cases, the non-transitory computer-readable medium may be separate from computer system 1300. In one example, the non-transitory computer-readable medium may be a removable medium provided to input device(s) 1306 (as shown in FIG. 13), such as those described in reference to input device(s) 1306, with instructions 1316 being read into computer system 1300 by input device(s) 1306. In another example, the non-transitory computer-readable medium may be a component of a remote electronic device, such as a mobile phone, that may wirelessly transmit a data signal that carries instructions 1316 to computer system 1300 and that is received by communications subsystem 1310 (as shown in FIG. 13).

Instructions 1316 may take any suitable form to be read and/or executed by computer system 1300. For example, instructions 1316 may be source code (written in a human-readable programming language such as Java, C, C++, C #, Python), object code, assembly language, machine code, microcode, executable code, and/or the like. In one example, instructions 1316 are provided to computer system 1300 in the form of source code, and a compiler is used to translate instructions 1316 from source code to machine code, which may then be read into main memory 1314 for execution by processor(s) 1304. As another example, instructions 1316 are provided to computer system 1300 in the form of an executable file with machine code that may immediately be read into main memory 1314 for execution by processor(s) 1304. In various examples, instructions 1316 may be provided to computer system 1300 in encrypted or unencrypted form, compressed or uncompressed form, as an installation package or an initialization for a broader software deployment, among other possibilities.

In one aspect of the present disclosure, a system (e.g., computer system 1300) is provided to perform methods in accordance with various embodiments of the present disclosure. For example, some embodiments may include a system comprising one or more processors (e.g., processor(s) 1304) that are communicatively coupled to a non-transitory computer-readable medium (e.g., memory device(s) 1312 or main memory 1314). The non-transitory computer-readable medium may have instructions (e.g., instructions 1316) stored therein that, when executed by the one or more processors, cause the one or more processors to perform the methods described in the various embodiments.

In another aspect of the present disclosure, a computer-program product that includes instructions (e.g., instructions 1316) is provided to perform methods in accordance with various embodiments of the present disclosure. The computer-program product may be tangibly embodied in a non-transitory computer-readable medium (e.g., memory device(s) 1312 or main memory 1314). The instructions may be configured to cause one or more processors (e.g., processor(s) 1304) to perform the methods described in the various embodiments.

In another aspect of the present disclosure, a non-transitory computer-readable medium (e.g., memory device(s) 1312 or main memory 1314) is provided. The non-transitory computer-readable medium may have instructions (e.g., instructions 1316) stored therein that, when executed by one or more processors (e.g., processor(s) 1304), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A geodetic apparatus comprising:
a telescope comprising a front lens having a lens center;
a tracking system for aligning an axis of the geodetic apparatus with a target, the tracking system comprising:
a first emitter horizontally offset from the lens center and configured to emit first light toward the target;
a first sensor horizontally offset from the lens center and configured to receive the first light reflected off the target;
a second emitter vertically offset from the lens center and configured to emit second light toward the target; and
a second sensor vertically offset from the lens center and configured to receive the second light reflected off the target; and
a processor configured to compute one or more corrective rotations for aligning the axis of the geodetic apparatus with the target based on the received first light and the received second light.

2. The geodetic apparatus of claim 1, wherein the first emitter and the first sensor are vertically aligned with the lens center, and wherein the second emitter and the second sensor are horizontally aligned with the lens center.

3. The geodetic apparatus of claim 1, wherein the first emitter and the first sensor are disposed on opposite horizontal sides of the front lens, and wherein the second emitter and the second sensor are disposed on opposite vertical sides of the front lens.

4. The geodetic apparatus of claim 1, further comprising:
one or more rotary actuators configured to rotate the telescope horizontally and/or vertically by the one or more corrective rotations to align the axis of the geodetic apparatus with the target.

5. The geodetic apparatus of claim 1, wherein the processor is further configured to:
obtain a first matrix of light values based on the received first light, the first matrix of light values corresponding to different vertical positions; and
obtain a second matrix of light values based on the received second light, the second matrix of light values corresponding to different horizontal positions.

6. The geodetic apparatus of claim 5, wherein the first matrix of light values is a one-dimensional (1D) matrix with different light values corresponding to the different vertical positions, and the second matrix of light values is a 1D matrix with different light values corresponding to the different horizontal positions.

7. The geodetic apparatus of claim 5, wherein the first matrix of light values is a two-dimensional (2D) matrix with different light values correspond to the different vertical positions and the different horizontal positions, and the second matrix of light values is a 2D matrix with different light values correspond to the different horizontal positions and the different vertical positions.

8. The geodetic apparatus of claim 7, wherein the processor is further configured to:

convert the first matrix of light values from the 2D matrix with different light values corresponding to the different vertical positions and the different horizontal positions to a one-dimensional (1D) matrix with different light values corresponding to the different vertical positions; and convert the second matrix of light values from the 2D matrix with different light values corresponding to the different horizontal positions and the different vertical positions to a 1D matrix with different light values corresponding to the different horizontal positions.

9. The geodetic apparatus of claim 5, wherein the processor is further configured to:

locate a vertical position of the target using the first matrix of light values; and locate a horizontal position of the target using the second matrix of light values.

10. The geodetic apparatus of claim 5, wherein the processor is further configured to:

compute a vertical rotation of the one or more corrective rotations using the first matrix of light values; and compute a horizontal rotation of the one or more corrective rotations using the second matrix of light values.

11. The geodetic apparatus of claim 1, wherein the axis of the geodetic apparatus is an optical aiming axis defined by the telescope.

12. The geodetic apparatus of claim 1, further comprising:

an electronic distance measurement (EDM) unit configured to emit third light toward the target, receive the third light reflected off the target, measure a distance between the geodetic apparatus and the target based on the received third light.

13. The geodetic apparatus of claim 12, wherein the EDM unit defines an EDM axis, and wherein the axis of the geodetic apparatus is the EDM axis.

14. The geodetic apparatus of claim 1, wherein the first emitter or the first sensor define a first tracker axis, the second emitter or the second sensor define a second tracker axis, and wherein the first tracker axis and the second tracker axis are each non-coaxial with the axis.

15. A method of operating a geodetic apparatus having a telescope, the method comprising:

emitting, by a first emitter horizontally offset from a lens center of the telescope, first light toward a target;

receiving, by a first sensor horizontally offset from the lens center, the first light reflected off the target;

emitting, by a second emitter vertically offset from the lens center, second light toward the target; and receiving, by a second sensor vertically offset from the lens center, the second light reflected off the target; and computing one or more corrective rotations for aligning an axis of the geodetic apparatus with the target based on the received first light and the received second light.

16. The method of claim 15, further comprising:

obtaining a first matrix of light values based on the received first light, the first matrix of light values corresponding to different vertical positions; and obtaining a second matrix of light values based on the received second light, the second matrix of light values corresponding to different horizontal positions.

17. The method of claim 16, further comprising:

locating a vertical position of the target using the first matrix of light values; and locating a horizontal position of the target using the second matrix of light values.

18. The method of claim 16, further comprising:

computing a vertical corrective rotation of the one or more corrective rotations using the first matrix of light values; and computing a horizontal corrective rotation of the one or more corrective rotations using the second matrix of light values.

19. A non-transitory computer-readable medium comprising instructions that, when executed by one or more processors, cause the one or more processors to perform operations comprising:

causing a first emitter horizontally offset from a lens center of a telescope to emit first light toward a target;

causing a first sensor horizontally offset from the lens center to receive the first light reflected off the target;

causing a second emitter vertically offset from the lens center to emit second light toward the target; and causing by a second sensor vertically offset from the lens center to receive the second light reflected off the target; and computing one or more corrective rotations for aligning an axis with the target based on the received first light and the received second light.

20. The non-transitory computer-readable medium of claim 19, further comprising:

obtaining a first matrix of light values based on the received first light, the first matrix of light values corresponding to different vertical positions;

obtaining a second matrix of light values based on the received second light, the second matrix of light values corresponding to different horizontal positions;

locating a vertical position of the target using the first matrix of light values;

locating a horizontal position of the target using the second matrix of light values;

computing a vertical corrective rotation of the one or more corrective rotations using the vertical position of the target; and computing a horizontal corrective rotation of the one or more corrective rotations using the horizontal position of the target.

\* \* \* \* \*